(12) United States Patent
Royer

(10) Patent No.: US 8,177,284 B1
(45) Date of Patent: May 15, 2012

(54) DEVICE AND METHOD FOR MANIPULATING A TARPAULIN

(76) Inventor: Réal Royer, Saint-Hyacinthe (CA)

( * ) Notice: Subject to any disclaimer, the term of this patent is extended or adjusted under 35 U.S.C. 154(b) by 0 days.

(21) Appl. No.: 12/926,453

(22) Filed: Nov. 18, 2010

(51) Int. Cl.
*B60P 7/04* (2006.01)
(52) U.S. Cl. ..................... 296/98; 296/100.16
(58) Field of Classification Search .............. 296/98, 296/100.16
See application file for complete search history.

(56) References Cited

U.S. PATENT DOCUMENTS

| | | | |
|---|---|---|---|
| 4,484,777 A | 11/1984 | Michel | |
| 4,505,512 A | 3/1985 | Schmeichel et al. | |
| 4,659,134 A | 4/1987 | Johnson | |
| 4,834,445 A | 5/1989 | Odegaard | |
| 4,991,640 A | 2/1991 | Verkindt et al. | |
| 5,002,328 A | 3/1991 | Michel | |
| 5,031,956 A | 7/1991 | Hudgins | |
| 5,466,030 A * | 11/1995 | Harris et al. | 296/98 |
| 5,542,734 A | 8/1996 | Burchett et al. | |
| 5,765,901 A * | 6/1998 | Wilkens | 296/98 |
| 5,984,379 A | 11/1999 | Michel et al. | |
| 6,135,534 A | 10/2000 | Schmeichel | |
| 6,206,449 B1 | 3/2001 | Searfoss | |
| 6,367,862 B2 | 4/2002 | Henning | |
| 6,478,361 B1 | 11/2002 | Wood | |
| 6,513,856 B1 | 2/2003 | Swanson et al. | |
| 6,588,361 B2 | 7/2003 | Biedenweg | |
| 6,641,199 B1 | 11/2003 | Hicks | |
| 6,805,395 B2 | 10/2004 | Royer | |
| 6,916,060 B2 | 7/2005 | Searfoss | |
| 6,926,337 B2 | 8/2005 | Poyntz | |
| 7,188,887 B1 | 3/2007 | Schmeichel | |
| 7,189,042 B1 | 3/2007 | Schmit | |
| 7,611,187 B1 | 11/2009 | Rogers | |
| 7,703,833 B2 | 4/2010 | Petelka | |
| 7,726,720 B2 | 6/2010 | Searfoss | |
| 2001/0020792 A1 | 9/2001 | Huotari | |
| 2004/0000798 A1 | 1/2004 | Royer | |
| 2005/0012355 A1 | 1/2005 | Searfoss | |
| 2005/0057068 A1 | 3/2005 | Searfoss | |
| 2006/0208524 A1 | 9/2006 | Brown et al. | |

* cited by examiner

*Primary Examiner* — Joseph Pape

(57) ABSTRACT

A method for manipulating and securing a tarpaulin across an aperture defining opposed aperture first and second ends, the tarpaulin being secured at one end thereof adjacent the aperture first end and secured to a rod at the other end thereof. With the tarpaulin at least partially rolled around a rod, the tarpaulin is unrolled from the rod and substantially simultaneously the rod is moved across the aperture toward the aperture second end so that the tarpaulin is extended across the aperture as the tarpaulin in unrolled from the rod. After the rod has been moved substantially adjacent to the aperture second end, the rod is inserted in the recess of a hook provided adjacent the aperture second end so as to prevent movements of the rod toward the aperture first end beyond a predetermined location. After inserting the rod in the recess, the tarpaulin is rolled around the rod to move the rod to the predetermined location and create a tension in the tarpaulin to secure the tarpaulin to the hook.

13 Claims, 5 Drawing Sheets

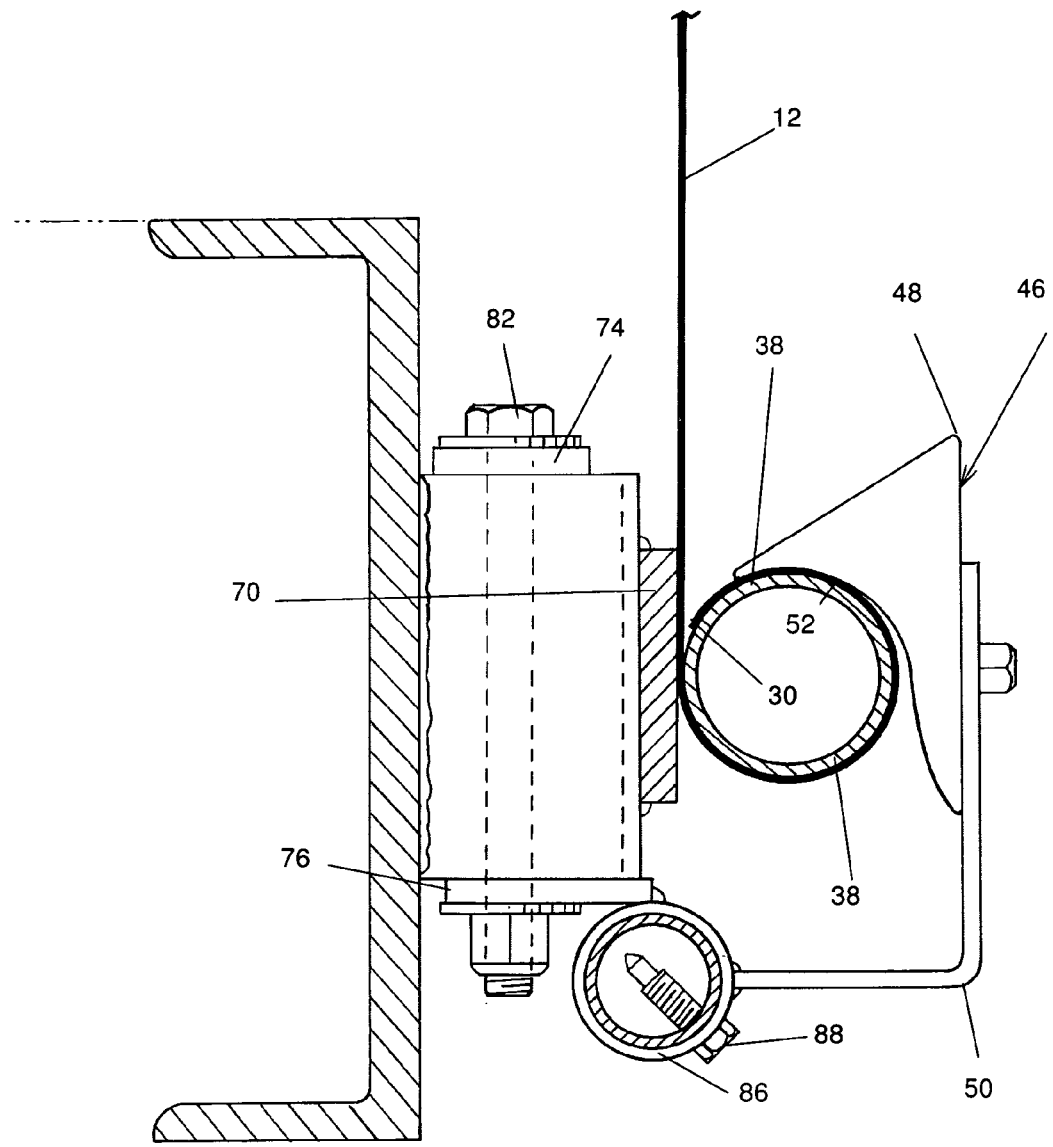
Fig_7 ated vehicle, or is part of a trailer or other similar device that is pulled by a motorized vehicle. In some embodiments of the invention, the aperture is in a single wall of the container. In other embodiments of the invention, the aperture is defined by a frame built on a conventional platform truck or platform trailer. In this latter case, many of the proposed devices are usable to manipulate tarpaulins across many side and top walls of the proposed container.

DEVICE AND METHOD FOR MANIPULATING A TARPAULIN

FIELD OF THE INVENTION

The present invention relates generally to tarpaulins. More specifically, the present invention is concerned with a device and a method for manipulating a tarpaulin.

BACKGROUND OF THE INVENTION

Many systems exist for covering apertures in cargo containers of vehicles. However, there is a specific type of container for which covering is still typically made manually. Indeed, in the live animal transportation industry, it is common to build a frame above a conventional platform truck or platform trailer. Cages are then piled inside this frame. In relatively warm weather, there is typically no need to cover the cages, and, in hot weather, it would be even dangerous to do so for the animals transported in the cages.

However, in cold weather, it is a common to extend tarpaulins around the sidewalls and/or top wall of the frame so that the cages can be enclosed. This process is performed manually and is therefore relatively time-consuming. Also, this process often requires that personnel climbs on the trailer to handle the tarpaulins, which can be relatively dangerous. Conventional systems for covering apertures in cargo containers are typically not usable as they would be hindered by the conventional equipment present on the platform.

Against this background, there exists a need in the industry to provide a novel device and method for manipulating a tarpaulin.

An object of the present invention is therefore to provide a device and method for manipulating a tarpaulin.

SUMMARY OF THE INVENTION

In a first broad aspect, the invention provides a method for securing a tarpaulin across an aperture using a hook defining a recess, the aperture being defined in a cargo container of a vehicle, the aperture defining an aperture first end and a substantially opposed aperture second end, the hook being provided substantially adjacent to the aperture second end, the tarpaulin defining a tarpaulin first end and a substantially opposed tarpaulin second end, the tarpaulin being secured to the container substantially adjacent the tarpaulin first end with the tarpaulin and aperture first ends substantially adjacent to each other, the tarpaulin being secured to a rod substantially adjacent the tarpaulin second end to allow rolling of the tarpaulin around the rod and unrolling of the tarpaulin from the rod. The method includes: with the tarpaulin at least partially rolled around the rod, unrolling the tarpaulin from the rod and substantially simultaneously moving the rod across the aperture toward the aperture second end so that the tarpaulin is extended across the aperture as the tarpaulin in unrolled from the rod; after the rod has been moved substantially adjacent to the aperture second end, inserting the rod in the recess of the hook so as to prevent movements of the rod toward the aperture first end beyond a predetermined location; after inserting the rod in the recess, rolling the tarpaulin around the rod to move the rod to the predetermined location and create a tension in the tarpaulin to secure the tarpaulin to the hook.

In another broad aspect, the invention provides a device for moving and securing a tarpaulin across an aperture defined in a cargo container of a vehicle, the aperture defining an aperture first end and a substantially opposed aperture second end, the tarpaulin defining a tarpaulin first end and a substantially opposed tarpaulin second end, the tarpaulin being secured to the container substantially adjacent the tarpaulin first end with the tarpaulin and aperture first ends substantially adjacent to each other. The device includes: a rod defining a rod longitudinal axis, the tarpaulin being securable to the rod substantially adjacent the tarpaulin second end to allow rolling of the tarpaulin thereonto and unrolling of the tarpaulin therefrom when the rod is rotated about the rod longitudinal axis; a support arm for supporting the rod, the rod being rotatably mounted to the support arm so as to be rotatable about the rod longitudinal axis, the support arm allowing movements of the rod across the aperture when the support arm is operatively mounted to the container, a rod actuator for selectively rotating the rod about the rod longitudinal axis; at least two hooks each provided substantially adjacent to the aperture second end, each of the hooks defining a respective hook first end and a substantially opposed hook second end, each of the hooks defining a recess substantially adjacent the hook second end for receiving the rod thereinto, each of the hooks being pivotally mounted to the container substantially adjacent to the hook first end so as to be movable between an open position and a closed position, the hook second end being further away from the aperture first end in the open position than in the closed position, the recess opening substantially away from the aperture first end when the hook is in the closed position; an axle defining an axle longitudinal axis, the axle being operatively coupled to all of the at least two hooks for providing substantially joint rotation of the at least two hooks between the open and closed positions when the axle is rotated about the axle longitudinal axis; an axle actuator operatively coupled to the axle for selectively rotating the axle about the axle longitudinal axis. After extending the tarpaulin across the aperture by unrolling the tarpaulin from the rod and moving the rod substantially adjacent to the aperture second end, the tarpaulin is securable across the aperture by rotating the at least two hooks from the open position to the closed position using the axle actuator, inserting the rod in the recess of each of the hooks and rolling the tarpaulin around the rod with the rod remaining in the recess using the rod actuator to create a tension in the tarpaulin.

Advantageously, the proposed device is relatively simple to operate using a series of relatively simple and quick steps. The proposed device is also inexpensive to manufacture. The proposed device can, in some embodiments of the invention, be retrofitted to conventional platform trucks or trailers without requiring extensive modifications and without interfering with the conventional equipment of such trucks and trailers.

The cargo container is either provided in a motorized vehicle, or is part of a trailer or other similar device that is pulled by a motorized vehicle. In some embodiments of the invention, the aperture is in a single wall of the container. In other embodiments of the invention, the aperture is defined by a frame built on a conventional platform truck or platform trailer. In this latter case, many of the proposed devices are usable to manipulate tarpaulins across many side and top walls of the proposed container.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 7, in a partial front cross-sectional view, illustrates the hook and rod as shown in FIG. 3.

DETAILED DESCRIPTION

Figure 1:
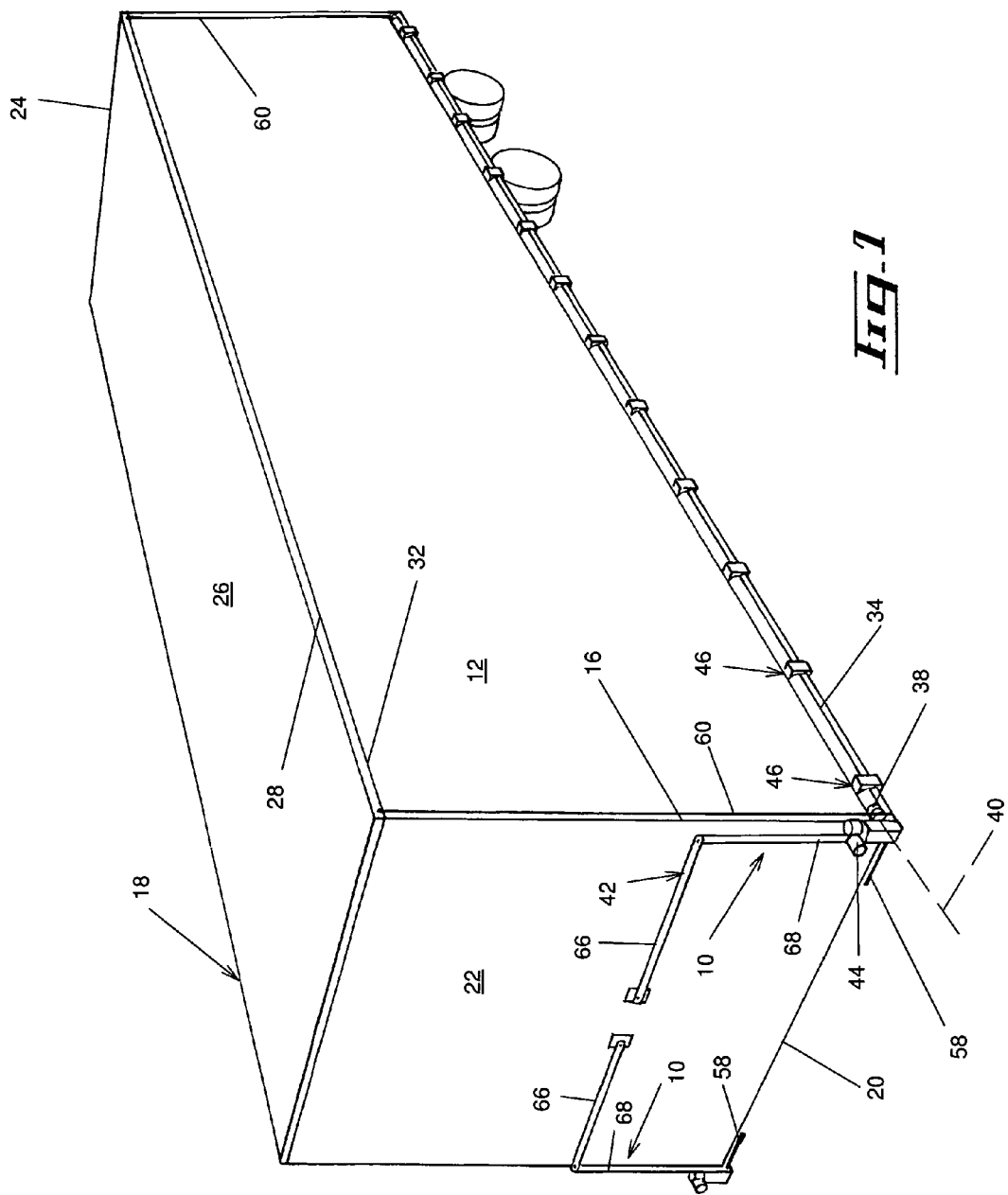
FIG. 1, in a perspective view, illustrates a device for manipulating a tarpaulin in accordance with an embodiment of the invention, the device being shown mounted to a container with the tarpaulin extending across an aperture.

FIG. 1 illustrates a device 10 for manipulating a tarpaulin 12 in accordance with an embodiment of the present invention. The device 10 is provided to selectively move and secure the tarpaulin 12 across a side aperture 16 defined in a cargo container container 18 of a vehicle. FIG. 1 illustrates a container 18 on which two devices 10 are mounted. However, it is within the scope of the invention to mount any other suitable number of device 10 on the container 18. The container 18 defines a bottom wall 20 and a pair of end walls 22 and 24 extending substantially upwardly from the bottom wall 22 at substantially opposed ends thereof. A top wall 26 extends between the end walls 22 and 24 substantially opposed to the bottom wall 22. Although the device 10 is shown for manipulating the tarpaulin 12 across the side aperture 16, it is within the scope of the invention to have similar devices that are operable for manipulating the tarpaulin 12 across a top aperture of the container 18. In this latter case, the top wall 26 is omitted from the container 18.

The tarpaulin 12 defines a tarpaulin first end 28 and a substantially opposed tarpaulin second end 30 (seen in FIG. 7). The aperture 16 defines an aperture first end 32 and a substantially opposed aperture second end 34. The tarpaulin 12 is secured in a conventional manner to the container 18 substantially adjacent the tarpaulin first end 28. The tarpaulin and aperture first ends 28 and 32 are substantially adjacent to each other.

For the purpose of this specification, the term tarpaulin should be understood to include tarpaulins per se, canvas, webs and any other suitable fabric that has a capability of retaining at least in part particles, liquids, gases, or any combination thereof, in the container 18.

The reader skilled in the art will readily appreciate that directional designations such as up, down, front, rear and side used in the present document are used only for clarity purposes and refer to the orientation of the device 10 and the container 18 in a typical use. However, the device 10 may be used with containers 18 having any other suitable orientation.

The tarpaulin 12 is configurable between an extended configuration and a retracted configuration. In the extended configuration, the tarpaulin 12 substantially covers the aperture 16. In FIG. 1, the tarpaulin 12 is shown in the extended configuration. In the retracted configuration shown in phantom lines in FIG. 2, the tarpaulin 12 is substantially retracted from the aperture 16.

Returning to FIG. 1, the device 10 includes a rod 38 defining a rod longitudinal axis 40. As better seen in FIG. 7, the tarpaulin 12 is secured to the rod 38 substantially adjacent the tarpaulin second end 30 to allow rolling of the tarpaulin thereonto and unrolling of the tarpaulin therefrom when the rod 38 is rotated about the rod longitudinal axis 40.

A support arm 42 is provided for supporting the rod 38. The support arm 42 is mounted to the container 18. The rod 38 is rotatably mounted to the support arm 42 so as to be rotatable about the rod longitudinal axis 40. The support arm 42 allows movements of the rod across the aperture 16 when operatively mounted to the container 18. Although not shown in the drawings, typically, the rod 38 is supported by a pair of support arms 42 provided at opposed ends thereof and each mounted to the container 18.

A rod actuator 44 is provided for selectively rotating the rod 38 about the rod longitudinal axis 40. For example, the rod actuator 44 takes the form of an electric motor operatively coupled to the support arm 42 and to the rod 38 for rotating the rod 38 about the rod longitudinal axis 40 with respect to the support arm 42. Typically, the rod actuator 44 is provided substantially adjacent the end of the support arm 42 that is not mounted to the container 18.

Typically, at least two hooks 46 are each provided substantially adjacent to the aperture second end 32. However, in alternative embodiments of the invention, only one hook 46 is provided. The number of hooks 46 depends on the length of the rod 38 as increasing the number of hooks better secures the trod 38.

Figure 3:
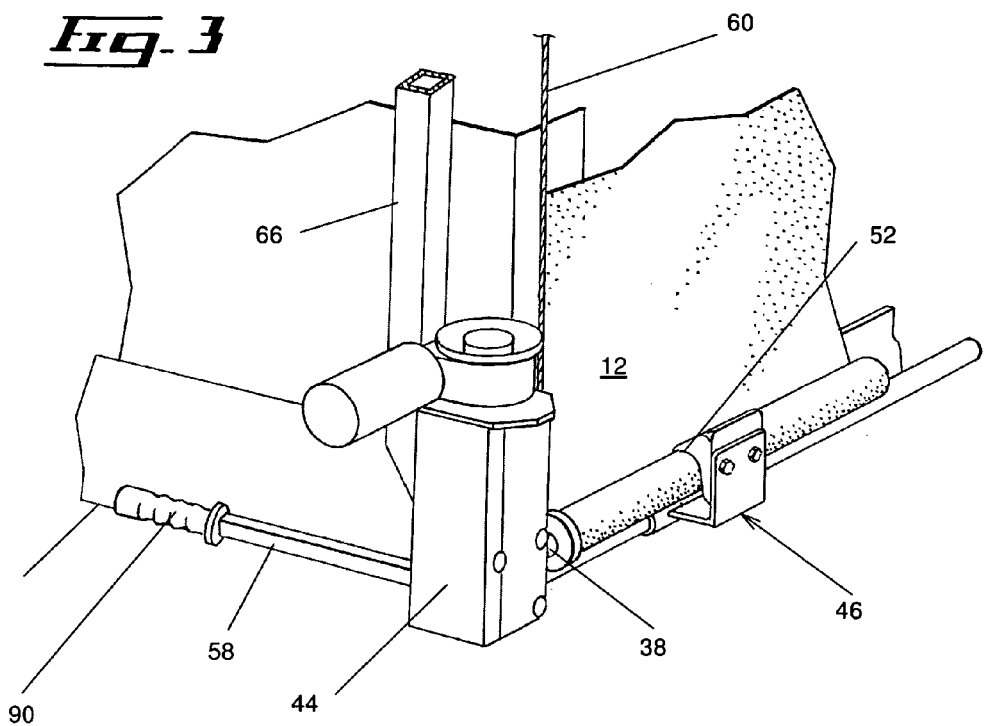
FIG. 3, in a partial perspective view, illustrates the device shown in FIGS. 1 and 2 with a hook thereof in a closed position, a rod part of the device being inserted in a recess defined by the hook.

As better seen in FIG. 7, each of the hooks 46 defines a respective hook first end 48 and a substantially opposed hook second end 50. Each of the hooks 46 defines a recess 52 substantially adjacent the hook second end 50 for receiving the rod 38 thereinto. Each of the hooks 46 is pivotally mounted to the container 18 substantially adjacent to the hook first end 48 so as to be movable between an open position, shown for example in FIG. 4, and a closed position, shown for example in FIG. 3. The hook second end 50 is further away from the aperture first end 32 in the open position than in the closed position. The recess 52 opens substantially away from the aperture first end 30 when the hook 46 is in the closed position.

An axle 54 defining an axle longitudinal axis 56 is operatively coupled to all of the hooks 46 for providing substantially joint rotation of the hooks 46 between the open and closed positions when the axle 54 is rotated about the axle longitudinal axis 56. An axle actuator 58 is operatively coupled to the axle 54 for selectively rotating the axle 54 about the axle longitudinal axis 56.

After extending the tarpaulin 12 across the aperture 16 by unrolling the tarpaulin 12 from the rod 38 and moving the rod 38 substantially adjacent to the aperture second end 32, the tarpaulin 12 is securable across the aperture 16 by rotating the hooks 46 from the open position to the closed position using the axle actuator 58, inserting the rod 38 in the recess 52 of each of the hooks 46 and rolling the tarpaulin 12 around the rod 38 with the rod 38 remaining in the recess 52 using the rod actuator 44 to create a tension in the tarpaulin 12.

In some embodiments of the invention, the device 10 also includes a guiding cable 60 extending between the aperture first and second ends 32 and 34. The guiding cable 60 forms at least one substantially tight loop 62 around the rod 38.

Typically, the rod 38 defines a groove 64 extending substantially circumferentially thereinto for receiving the loop 62. Typically, the guiding cable 60 is provided substantially adjacent at least one of the end walls 22 and 24, and in some embodiments of the invention another guiding cable 60 is provided substantially adjacent each one of the end walls 22 and 24. In these latter embodiments, a pair of grooves the 64 are provided in the rod 38 substantially adjacent each end thereof.

In some embodiments of the invention, the support arm 42 is an articulated arm. To that effect, the support arm 42 includes an arm first section 66 and an arm second section 68 pivotally mounted to the arm first section 66. The arm first section 66 is pivotally mounted the container 18, for example to the end walls 22 and 24, substantially opposed to the arm second section 68 so as to be pivotable in the plane substantially perpendicular to the rod longitudinal axis 40. The rod 38 is mounted to the arm second section 68 substantially opposed to the arm first section 66. The rod actuator 44 is also typically mounted substantially adjacent to the rod 38 for allowing selective rotation of the rod 38 with respect to the arm second section 68.

Figure 6:
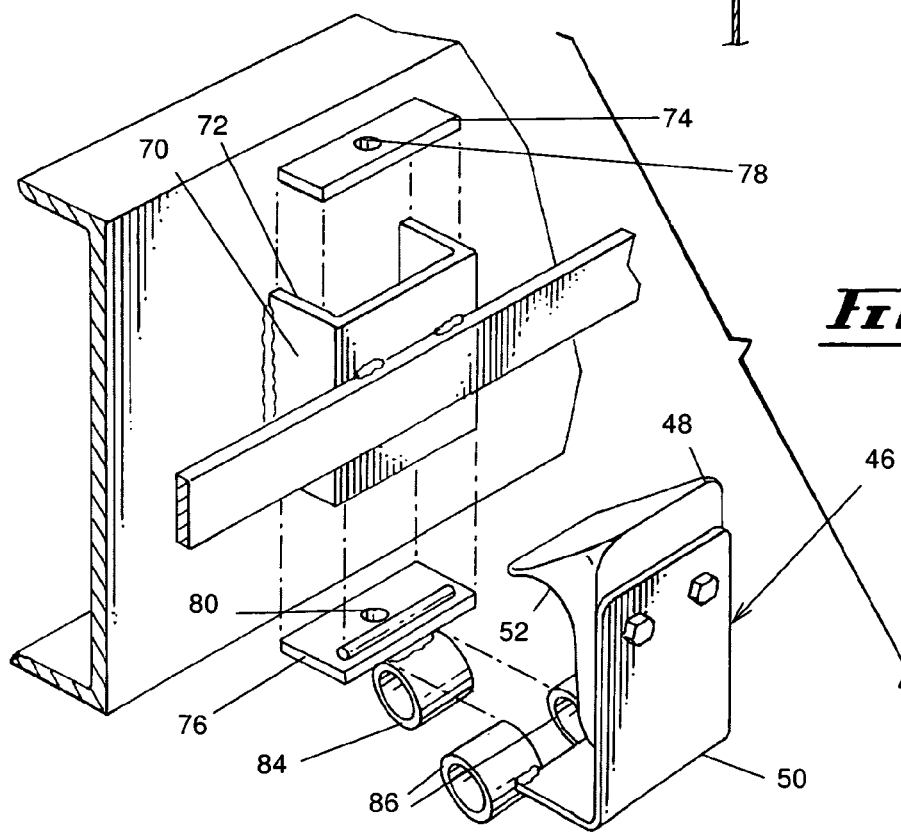
FIG. 6, in an exploded perspective view, illustrates the hook shown in FIGS. 3 and 4.

As seen in FIG. 6, in some embodiments of the invention, the hooks 46 are mountable to conventional sleeves 70 provided at the periphery of a conventional platform. These sleeves 70 typically define a passageway 72 extending substantially vertically and are provided for inserting thereinto posts or other devices. These conventional sleeves 70 are conveniently used in the present invention to mount the hooks 46 in the following manner.

Figure 4:
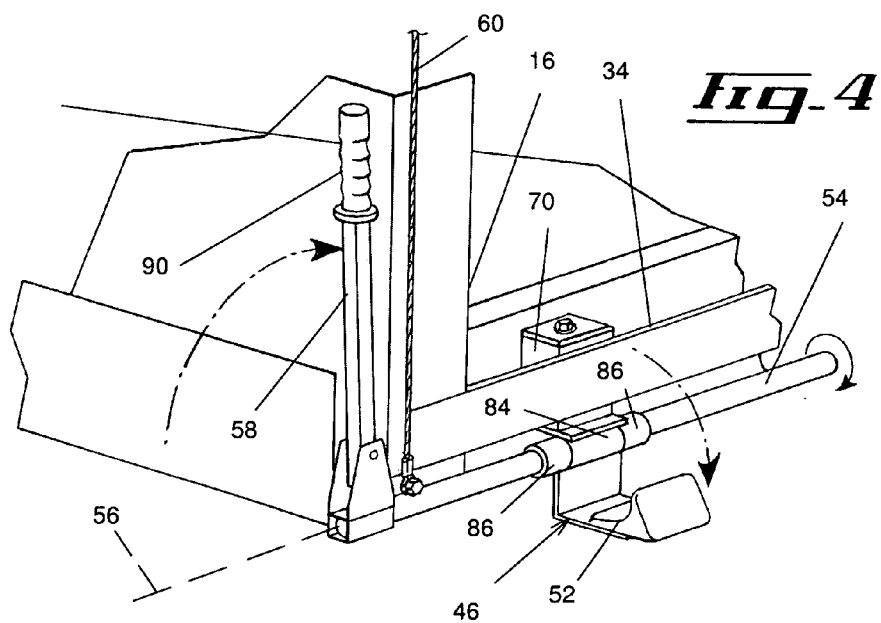
FIG. 4, in a partial perspective view, illustrates the device shown in FIGS. 1 to 3 with the hook thereof in an open position.
Figure 5:
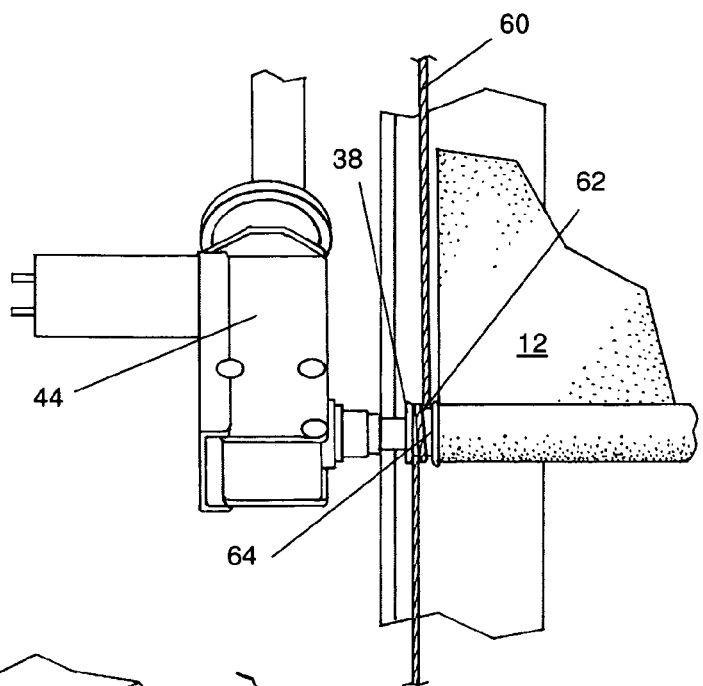
FIG. 5, in a partial perspective view, illustrates a cable extending across the aperture across which the tarpaulin is manipulated by the device shown in FIGS. 1 to 4, the cable forming a loop around the rod.

Top and bottom mounting plates 74 and 76 are provided. The top and bottom mounting plates 74 and 76 each define a respective fastener receiving aperture 78 and 80 extending therethrough for receiving a fastener 82, seen in FIG. 4. A collar 84 extends from the bottom mounting plate 76 substantially laterally outwardly away from the sleeve 70. As seen in FIG. 4, the top and bottom mounting plates 74 and 76 are positioned respectively above and below the passageway 72 and abut against the sleeve 70. The fastener 82 extends through the fastener receiving aperture 78 and 80 and is used to bias the top and bottom mounting plates 74 and 76 towards each other so as to secure the top and bottom mounting plates 74 and 76 to the sleeve 70.

Each of the hooks 46 is provided with a pair of collars 86 substantially adjacent to the hook first end 48. The collars 86 are substantially axially spaced apart from each other by a distance sufficient for receiving the collar 84 therebetween. The axle 54 extends through the collars 84 and 86 and is operatively coupled thereto for joint rotation with the collars 86 of the hooks 46 about the axle longitudinal axis 56. For example, this is achieved by extending a fastener 88, such as a screw, through the collars 86 and the axle 54, as shown in FIG. 7.

Referring to FIG. 4, in some embodiments of the invention, the axle actuator 58 includes a handle 90 operable by an intended user to rotate the axle 54 about the axle longitudinal axis. To that effect, the handle 90 is mounted to the axle 54 so as to extend substantially perpendicularly to the axle longitudinal axis 56.

In use, device 10 is used in a method for securing the tarpaulin 12 across the aperture 16 as follows. First, as seen in phantom lines in FIG. 2, the tarpaulin 12 is provided in the retracted position, at least partially rolled around the rod 38. Then, the tarpaulin 12 is unrolled from the rod 38, which is substantially simultaneously moved by the rod 38 across the aperture 16 toward the aperture second end 34 so that the tarpaulin 12 is extended across the aperture 16 as the tarpaulin 12 in unrolled from the rod 38. These two actions are performed substantially simultaneously by the rod actuator 44 as the rod 38 is rotated in a direction leading to unwinding of the tarpaulin 12 therefrom. In embodiments of the invention in which the guiding cable 60 is provided, moving the rod 38 across the aperture 16 includes guiding the rod 38 so that the rod 38 is substantially prevented from freely moving away from the aperture 16 by the guiding cable 60. As the rod 38 moves along the aperture 16, the loop 62 is provided in different sections of the guiding cable 60, which is gradually wound and simultaneously unwound from the rod 38.

Figure 2:
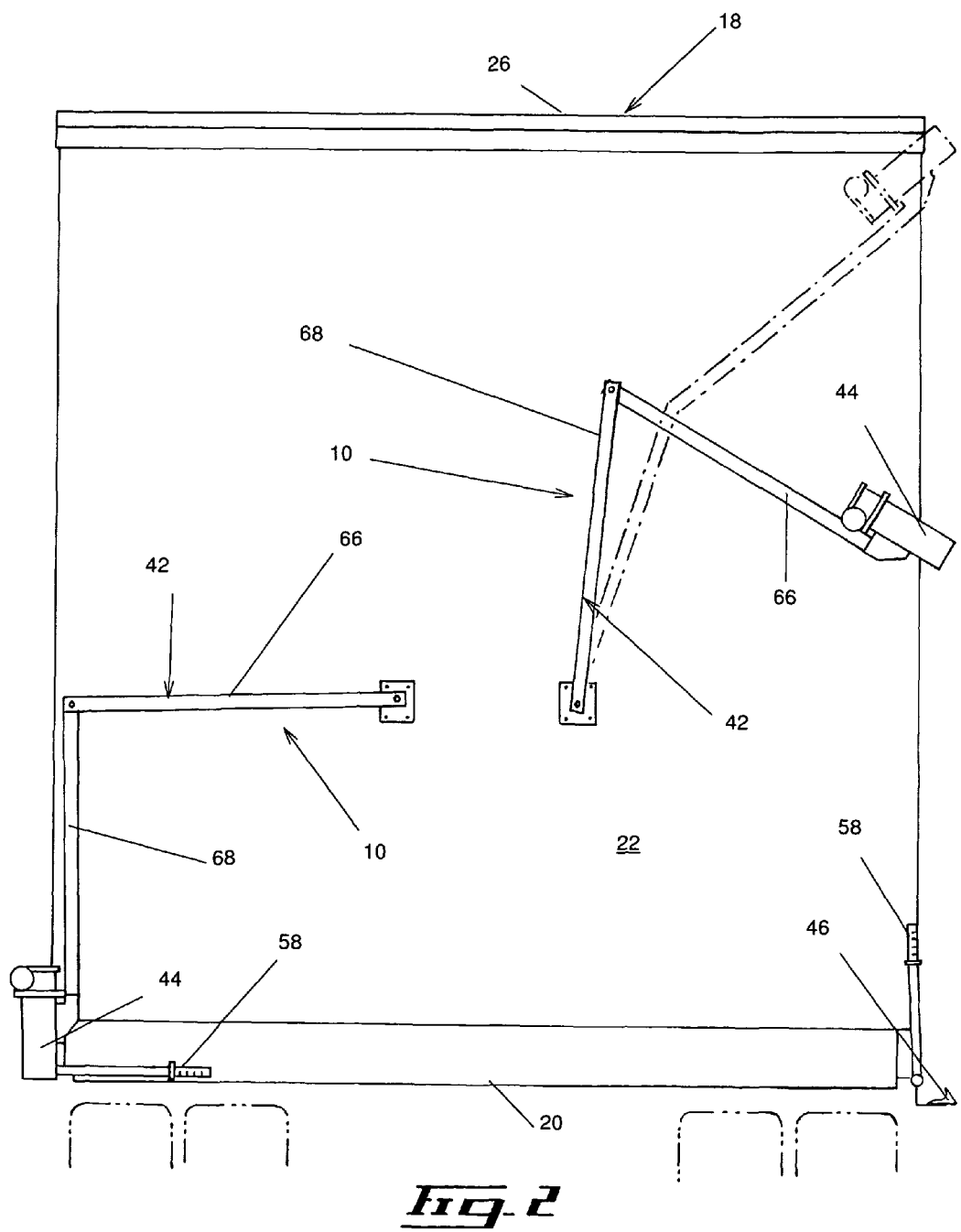
FIG. 2, in a front elevation view, illustrates the device shown in FIG. 1.

After the rod 38 has been moved substantially adjacent to the aperture second end 34, the tarpaulin 12 is in the extended configuration, as seen for the leftmost device 10 and tarpaulin 12 of FIG. 2. Then, the rod 38 is inserted in the recess 52 of the hook 46 so as to prevent movements of the rod 38 toward the aperture first end beyond a predetermined location.

After inserting the rod 38 in the recess 52, rolling the tarpaulin 12 around the rod 38 to move the rod 38 to the predetermined location creates a tension in the tarpaulin 12 to secure the tarpaulin 12 to the hooks 46.

The rod 38 is stopped from moving toward the aperture first end 32 by the hook 46 beyond the predetermined location when the hooks 46 are in the closed position and the rod is inserted in the recess 52. The rod 38 is movable substantially freely with respect to the hook 46 when the hook 46 is in the open position and the rod 38 is substantially adjacent to the predetermined location. Therefore, inserting the rod 38 in the recess 52 includes moving the hook 46 from the open position to the closed position when the rod 38 has been moved substantially adjacent to the hook 46 to a position closer to the aperture second end 34 than the predetermined location. For example, this action is performed by pivoting the hook 46 with respect to the container 18 from the open position to the closed position using the handle 90. In the embodiment of the invention shown in the drawings, this action is performed substantially simultaneously and substantially jointly for all the hooks 46 which are provided at substantially longitudinally spaced apart positions along the rod 38.

To retract the tarpaulin 12 from the aperture 16, the tarpaulin 12 is unrolled from the rod 38 to substantially eliminate the tension in the tarpaulin 12. Afterwards, the rod 38 is detached from the hooks 46, which are then pivoted to the open position to allow retraction of the tarpaulin 12.

In embodiments of the invention in which the aperture 16 is substantially vertical and the aperture first end 32 is above the aperture second end 34, moving the rod 38 across the aperture 16 includes moving the rod 38 substantially downwardly. In embodiments of the invention in which the aperture 16 is substantially horizontal, moving the rod 38 across the aperture 16 includes moving the rod 38 substantially horizontally across the aperture 16.

Although the present invention has been described hereinabove by way of preferred embodiments thereof, it can be modified, without departing from the spirit and nature of the subject invention as defined in the appended claims.

What is claimed is:

1. A method for securing a tarpaulin across an aperture using a hook defining a recess, said aperture being defined in a cargo container of a vehicle, said aperture defining an aperture first end and a substantially opposed aperture second end, said hook being provided substantially adjacent to said aperture second end, said tarpaulin defining a tarpaulin first end and a substantially opposed tarpaulin second end, said tarpaulin being secured to said container substantially adjacent said tarpaulin first end with said tarpaulin and aperture first ends substantially adjacent to each other, said tarpaulin being secured to a rod substantially adjacent said tarpaulin second end to allow rolling of said tarpaulin around said rod and unrolling of said tarpaulin from said rod, said hook being mounted to said cargo container substantially adjacent to said aperture second end so as to be pivotable between an open position and a closed position, said rod being stopped from moving toward said aperture first end by said hook beyond said predetermined location when said hook is in said closed position and said rod is inserted in said recess, and said rod being movable substantially freely with respect to said hook when said hook is in said open position and said rod is substantially adjacent to said predetermined location, said method comprising:

with said tarpaulin at least partially rolled around said rod, unrolling said tarpaulin from said rod and substantially simultaneously moving said rod across said aperture toward said aperture second end so that said tarpaulin is extended across said aperture as said tarpaulin is unrolled from said rod;

after said rod has been moved substantially adjacent to said aperture second end, inserting said rod in said recess of said hook so as to prevent movements of said rod toward said aperture first end beyond a predetermined location;

after inserting said rod in said recess, rolling said tarpaulin around said rod to move said rod to said predetermined location and create a tension in said tarpaulin to secure said tarpaulin to said hook;

wherein inserting said rod in said recess includes moving said hook from said open position to said closed position when said rod has been moved substantially adjacent to said hook to a position closer to said aperture second end than said predetermined location.

2. A method as defined in claim 1, wherein said hook is pivotally mounted to said container substantially adjacent to said aperture second end so as to be movable between said open and closed position by pivoting said hook with respect to said container, moving said hook from said open position to said closed position including pivoting said hook from said open position to said closed position.

3. A method as defined in claim 2, wherein a plurality of hooks are each pivotally mounted to said container substantially adjacent to said aperture second end so as to be movable between said open and closed position by pivoting with respect to said container, said hooks being operatively coupled to each other so as to be substantially simultaneously and substantially jointly movable between said open and closed position, said hooks being provided at substantially longitudinally spaced apart positions along said rod, said method further comprising substantially simultaneously inserting said rod in said recesses of each of said hooks so as to prevent movements of said rod toward said aperture first end beyond said predetermined location.

4. A method as defined in claim 1, further comprising, after rolling said tarpaulin around said rod to create said tension in said tarpaulin, unrolling said tarpaulin from said rod to substantially eliminate said tension in said tarpaulin and subsequently detaching said rod from said hook.

5. A method as defined in claim 1, wherein said aperture is substantially vertical and said aperture first end is above said aperture second end, moving said rod across said aperture including moving said rod substantially downwardly.

6. A method as defined in claim 1, wherein said aperture is substantially horizontal, moving said rod across said aperture including moving said rod substantially horizontally across said aperture.

7. A method as defined in claim 1, wherein moving said rod across said aperture includes guiding said rod so that said rod is substantially prevented from freely moving away from said aperture.

8. A device for moving and securing a tarpaulin across an aperture defined in a cargo container of a vehicle, said aperture defining an aperture first end and a substantially opposed aperture second end, said tarpaulin defining a tarpaulin first end and a substantially opposed tarpaulin second end, said tarpaulin being secured to said container substantially adjacent said tarpaulin first end with said tarpaulin and aperture first ends substantially adjacent to each other, said device comprising:

a rod defining a rod longitudinal axis, said tarpaulin being securable to said rod substantially adjacent said tarpaulin second end to allow rolling of said tarpaulin thereonto and unrolling of said tarpaulin therefrom when said rod is rotated about said rod longitudinal axis;

a support arm mountable to said container for supporting said rod, said rod being rotatably mounted to said support arm so as to be rotatable about said rod longitudinal axis, said support arm allowing movements of said rod across said aperture when said support arm is operatively mounted to said container;

a rod actuator for selectively rotating said rod about said rod longitudinal axis;

at least two hooks each provided substantially adjacent to said aperture second end, each of said hooks defining a respective hook first end and a substantially opposed hook second end, each of said hooks defining a recess substantially adjacent said hook second end for receiving said rod thereinto, each of said hooks being pivotally mounted to said container substantially adjacent to said hook first end so as to be movable between an open position and a closed position, said hook second end being further away from said aperture first end in said open position than in said closed position, said recess opening substantially away from said aperture first end when said hook is in said closed position;

an axle defining an axle longitudinal axis, said axle being operatively coupled to all of said at least two hooks for providing substantially joint rotation of said at least two hooks between said open and closed positions when said axle is rotated about said axle longitudinal axis; and an axle actuator operatively coupled to said axle for selectively rotating said axle about said axle longitudinal axis;

wherein, after extending said tarpaulin across said aperture by unrolling said tarpaulin from said rod and moving said rod substantially adjacent to said aperture second end, said tarpaulin is securable across said aperture by rotating said at least two hooks from said open position to said closed position using said axle actuator, inserting said rod in said recess of each of said hooks and rolling said tarpaulin around said rod with said rod remaining in said recess using said rod actuator to create a tension in said tarpaulin.

9. A device as defined in claim 8, further comprising a guiding cable extending between said aperture first and second ends, said guiding cable forming at least one substantially tight loop around said rod.

10. A device as defined in claim 9, wherein said rod defines a groove receiving said at least one substantially tight loop.

11. A device as defined in claim 8, wherein said arm is an articulated arm.

12. A device as defined in claim 8, wherein said axle actuator includes a handle operable by an intended user to rotate said axle about said axle longitudinal axis.

13. A device as defined in claim 8, wherein said rod actuator includes an electric motor operatively coupled to said support arm and to said rod for rotating said rod about said rod longitudinal axis with respect to said support arm.

* * * * *